United States Patent

[11] 3,626,308

[72] Inventors Thomas O. Paine
Administrator of the National Aeronautics and Space Administration with respect to an invention of;
Robert B. Crow, Sierra Madre, Calif.

[21] Appl. No. 887,685
[22] Filed Dec. 23, 1969
[45] Patented Dec. 7, 1971

[54] WIDE-BAND DOUBLER AND SINE WAVE QUADRATURE GENERATOR
9 Claims, 4 Drawing Figs.

[52] U.S. Cl. .......... 328/166, 328/16, 328/20, 328/38, 307/295
[51] Int. Cl. .......... H03b 1/04
[50] Field of Search .......... 328/15, 16, 17, 18, 20, 24, 38, 166–167; 307/295, 262; 321/51, 56, 60, 65–66, 54

[56] References Cited

UNITED STATES PATENTS

| | | | |
|---|---|---|---|
| 2,743,367 | 4/1956 | Felch et al. | 328/16 |
| 2,790,847 | 4/1957 | Houghton | 328/16 |
| 3,355,668 | 11/1967 | Boensel et al. | 328/166 |
| 3,403,259 | 9/1968 | Lund | 321/51 |
| 3,464,016 | 8/1969 | Kerwin et al. | 328/166 |
| 3,493,876 | 2/1970 | Zimmerman | 328/167 |
| 3,252,074 | 5/1966 | Maine | 321/54 |
| 3,532,898 | 10/1970 | Anderson | 328/166 |

*Primary Examiner*—Donald D. Forrer
*Assistant Examiner*—R. E. Hart
*Attorneys*—J. H. Warden, Paul F. McCaul and G. T. McCoy

ABSTRACT: A wide-band signal quadrature and second harmonic generator comprising a voltage-controlled phase shifter which provides an output representing a phase-shifted sine input signal. The input signal and the phase shifter's output are multiplied by a multiplier whose output, after integration, is used to control the illumination levels of photoresistors in the phase shifter so that the output of the phase shifter is the cosine of the sine input signal. The multiplier's output when phase lock is achieved is the second harmonic of the sine input signal. The photoresistors in the phase shifter have large dynamic ranges of resistance changes to enable the generator to operate over a wide band of input signal frequencies.

INVENTOR.
ROBERT B. CROW
BY
ATTORNEYS

ROBERT B. CROW
INVENTOR.

BY [signature]
ATTORNEYS

INVENTOR.
ROBERT B. CROW
BY
ATTORNEYS

WIDE-BAND DOUBLER AND SINE WAVE QUADRATURE GENERATOR

ORIGIN OF INVENTION

The invention described herein was made in the performance of work under a NASA contract and is subject to the provisions of Section 305 of the National Aeronautics and Space Act of 1958, Public Law 85-568 (72 state 435; 42 USC 2457).

BACKGROUND OF THE INVENTION

1. Field of the Invention

The present invention relates to phase-shifting circuitry and, more particularly, to a generator, operable over a wide band of frequencies to produce the quadrature and the second harmonic of an input signal of a frequency in said band.

2. Description of the Prior Art

Most phase-shifting circuits, which are presently in existence, are generally frequency sensitive. Consequently, their operation is limited to a narrow band of input frequencies. This limitation is of particular disadvantage in cases in which the quadrature and/or the second harmonic of a sinusoidal input signal which is variable over a wide band of frequencies, are needed. One application in which such signals are needed is the generation of command modulation signals used in a space communication system, in which signals, varying in frequency from 100 Hz. to 100 kHz. are present. Thus, a need exists for a wide-band signal doubler and quadrature generator.

OBJECTS AND SUMMARY OF THE INVENTION

It is a primary object of the present invention to provide a new generator which produces a quadrature signal of an input signal whose frequency may vary within a wide band of frequencies.

Another object of the present invention is to provide a new, second harmonic generator, operable in response to an input signal which is variable over a wide band of frequencies.

A further object of the present invention is to provide a novel generator which, in response to an input sine wave of a frequency which may vary over a wide frequency range, provides the second harmonic of the input sine wave and a cosine wave, representing the input signal quadrature.

These and other objects of the invention are achieved by providing a generator with a unique phase locked loop, which includes a voltage-controlled phase shifter in which, two photoresistors are incorporated as part of two series resistor-capacitor (RC) phase shifters. The resistances of the two photoresistors are controlled so that in response to a sine wave input signal, $\sin(wt)$ the output of the phase shifter is phase locked at 90° from the input signal. Consequently, the output signal is a cosine wave, represented as $\cos(wt)$. The sine input signal and the cosine output signal are multiplied to provide the input signal second harmonic which is represented by $\sin(2wt)$.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
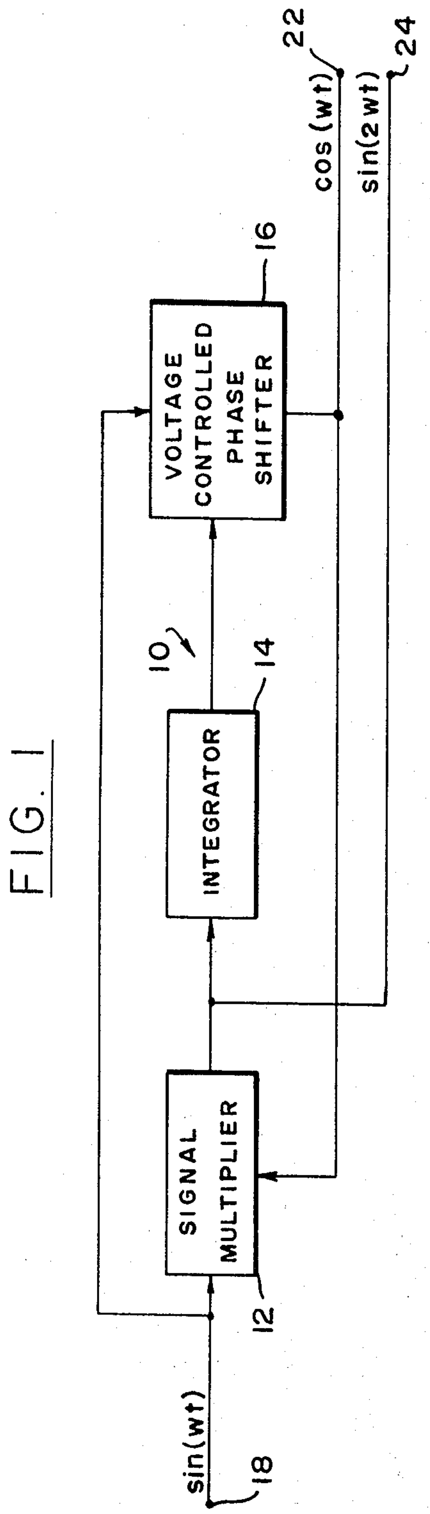
FIG. 1 is a simple diagram of the generator of the present invention.

Attention is directed to FIG. 1 wherein the generator of the present invention, designated by numeral 10, is shown comprising a phase-locked loop, which includes a signal multiplier 12, an integrator 14 and a voltage-controlled phase shifter 16. The input signal, assumed to be a sine wave, expressed as $\sin(wt)$, is received at an input terminal 18. This input signal is supplied to the phase shifter 18, whose output is multiplied by the input signal in multiplier 12. The output of multiplier 12 is integrated in integrator 14, whose output, representing a control voltage is used to control the phase shifting in phase shifter 16.

The phase shifter 16 is designed to provide a 90° phase shift when phase lock is achieved. Thus, with an input sine wave $\sin(wt)$, the output of the phase shifter is a cosine wave, $\cos(wt)$. This output is applied at an output terminal 22. When phase lock is obtained, the product of the two signals, $\sin(wt)$ and $\cos(wt)$, which are supplied to multiplier 12 is $\frac{1}{2}\sin(2wt)$, which is the second harmonic of the input signal, $\sin(wt)$. The output of the multiplier is applied at a second output terminal 24.

The phase shifter 16 includes means which enable phase lock to be achieved over a wide band of input signal frequencies. These means comprise two photoresistors with large dynamic ranges of resistance changes in response to illumination variations. The two photoresistors are incorporated in two RC phase-shifting networks, each designed to provide 45° of phase shift. It is the two photoresistors which provide the generator with its wide-band characteristic.

Figure 2:
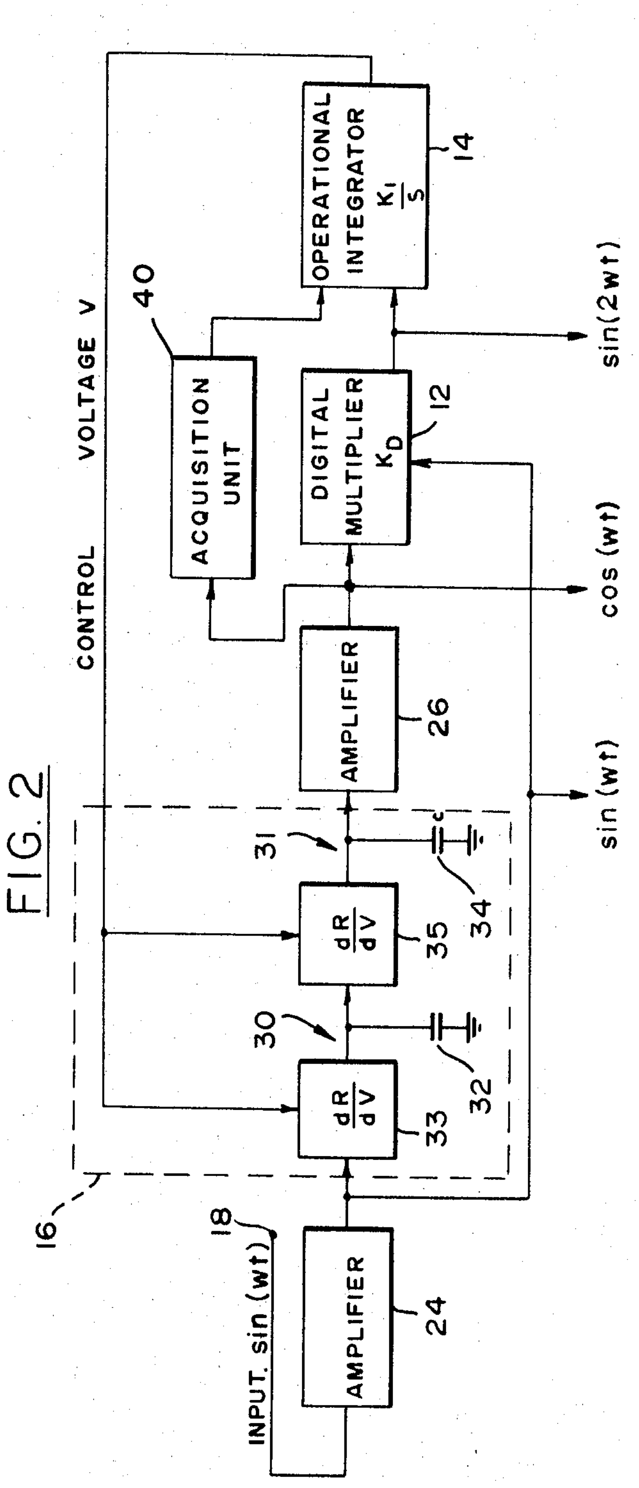
FIGS. 2 and 3 are more detailed block diagrams of the generator of the present invention.

Attention is now directed to FIG. 2 wherein the generator 10 is diagrammed in greater detail. Therein elements like those previously described are designated by like numerals. In this figure, the multiplier 12 is shown comprising a digital multiplier, the integrator 14 is shown comprising an operational integrator. The input signal is assumed to be amplified by an amplifier 24. Likewise, a buffer amplifier 26 is shown in the path of the signal between the phase shifter 16 and the multiplier 12.

The phase shifter 16 is shown comprising two serially connected resistor-capacitor (RC) networks 30 and 31. Network 30 consists of a capacitor 32 and the resistor of a first photoresistor. As is appreciated, the resistance of such a resistor is a function of the illumination provided the photoresistor's lamp which is in turn a function of the voltage which is applied to the lamp. Thus, in FIG. 2 the resistor of the photoresistor, incorporated in network 30, is designated by block 33 with the legend. Similarly, network 31 includes a capacitor 34 and a resistor of another photoresistor, represented by block 35 with the legend. As shown the control voltage from the integrator 14 is supplied to blocks 33 and 35.

In reducing the invention to practice it was discovered that decade step changes in input-signal frequency sometimes resulted in shocking the integrator so that the polarity of the control voltage was momentarily reversed. In a particular embodiment the desired control voltage ranged from −2 to −10 v. DC. Yet, integrator shock often produced positive control voltages. When this occurred the loop no longer had control since lamps of two photoresistors are equally sensitive to either polarity of the control voltage. Consequently, when loop control was lost the integrator continued to integrate until it reached saturation.

In order to eliminate this undesired phenomenon, an acquisition unit, designated in FIG. 2 by numeral 40 in incorporated. The function of unit 40, which is connected between the output of buffer amplifier 26 at the output of the phase shifter 16 and the integrator 14, is to sense when the loop no longer has control, a condition which is manifest by a momentary loss of illumination of the lamps of the two photoresistors. When loss of control is sensed, the unit 40 applies a discrete command or input to the integrator to cause its output voltage to be of the proper polarity (negative in the particular example). Once this is achieved the loop assumes control, enabling it to vary the phase shift until the proper phase lock is obtained.

Figure 3:
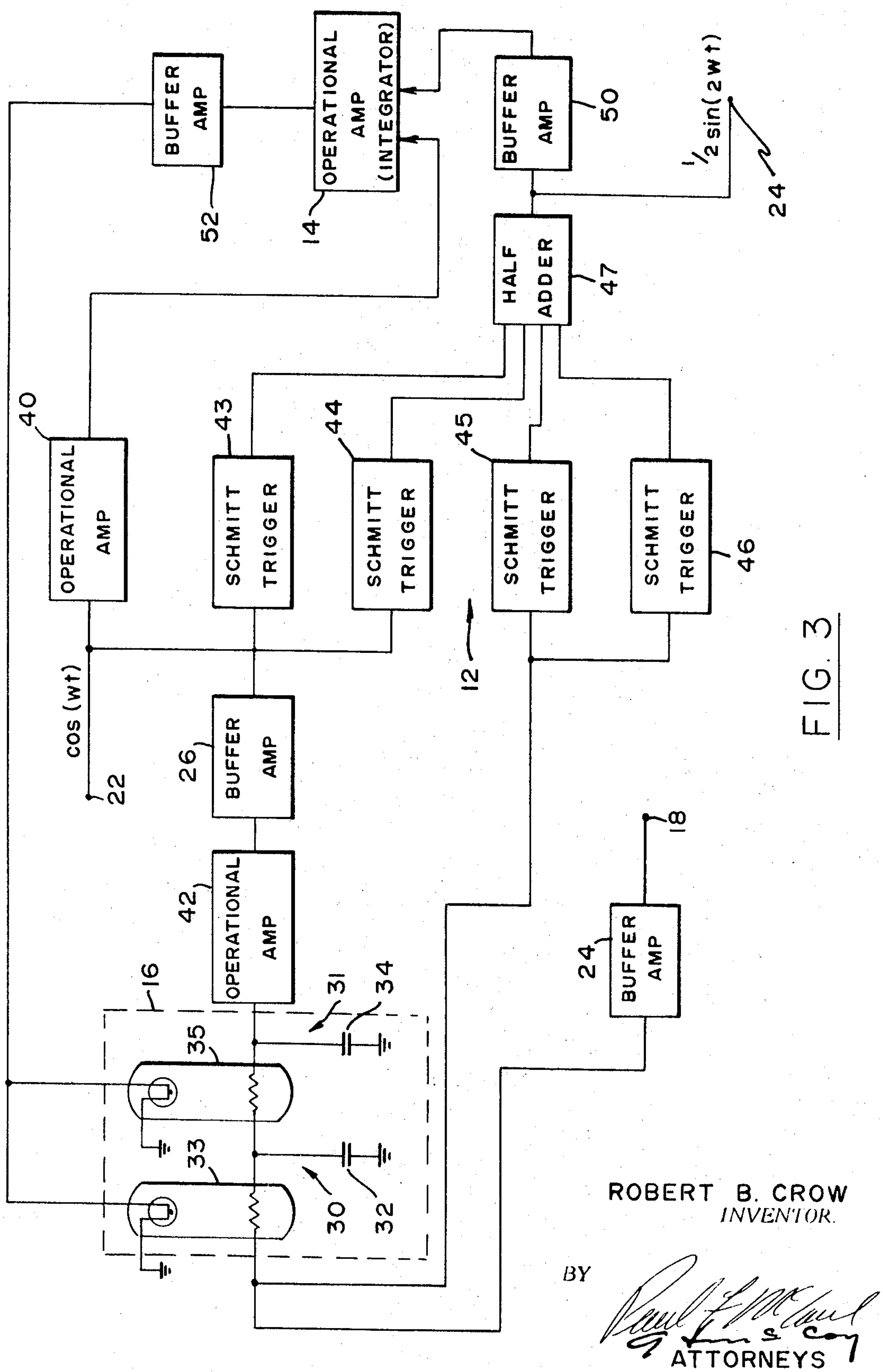

Attention is now directed to FIG. 3 which is a more detailed block diagram of the present invention. As shown therein the output of the phase shifter 16 is connected to the buffer amplifier through an operational amplifier 42. This amplifier is incorporated for its high input impedance which is required in order not to affect the resistance range of the two photoresistors 33 and 35. In FIG. 3 the digital multiplier 12 is shown comprising four Schmitt triggers 43–46 and a half adder 47.

In operation, units 43 and 44 produce two complementary square waves as a function of the sinusoidal output of amplifier 26 which corresponds to the phase shifted output of phase shifter 16. Likewise, units 45 and 46 provide two complementary square waves which correspond to the sinusoidal input signal at input terminal 18. The outputs of the four units are supplied to the half adder 47, whose output is a perfect square wave only when the output of the phase shifter 16 is shifted by 90° with respect to the input signal. That is, the output of the half adder is a perfect square wave only when in response to the input signal $\sin(wt)$ the output of the phase shifter is $\cos(wt)$. Clearly, the frequency of the square wave depends on the input signal frequency.

If, however, the phase shifter's output is not the cosine of the sine input signal, the output of the half adder is not a perfect square wave, so that it contains a DC component. It is this component which serves as an error signal and which is integrated to vary the control voltage of the lamps of the two photoresistors in a direction so as to minimize the error signal.

In FIG. 3, the output of the half adder 47 is supplied to the integrator 14 through a buffer amplifier 50. The integrator is actually an operational amplifier connected to an integrator configuration. The output of the integrator is supplied to the lamps of the photoresistors through a buffer amplifier 52. As shown, in FIG. 3 the acquisition unit 40 is implemented by an operational amplifier.

Figure 4:
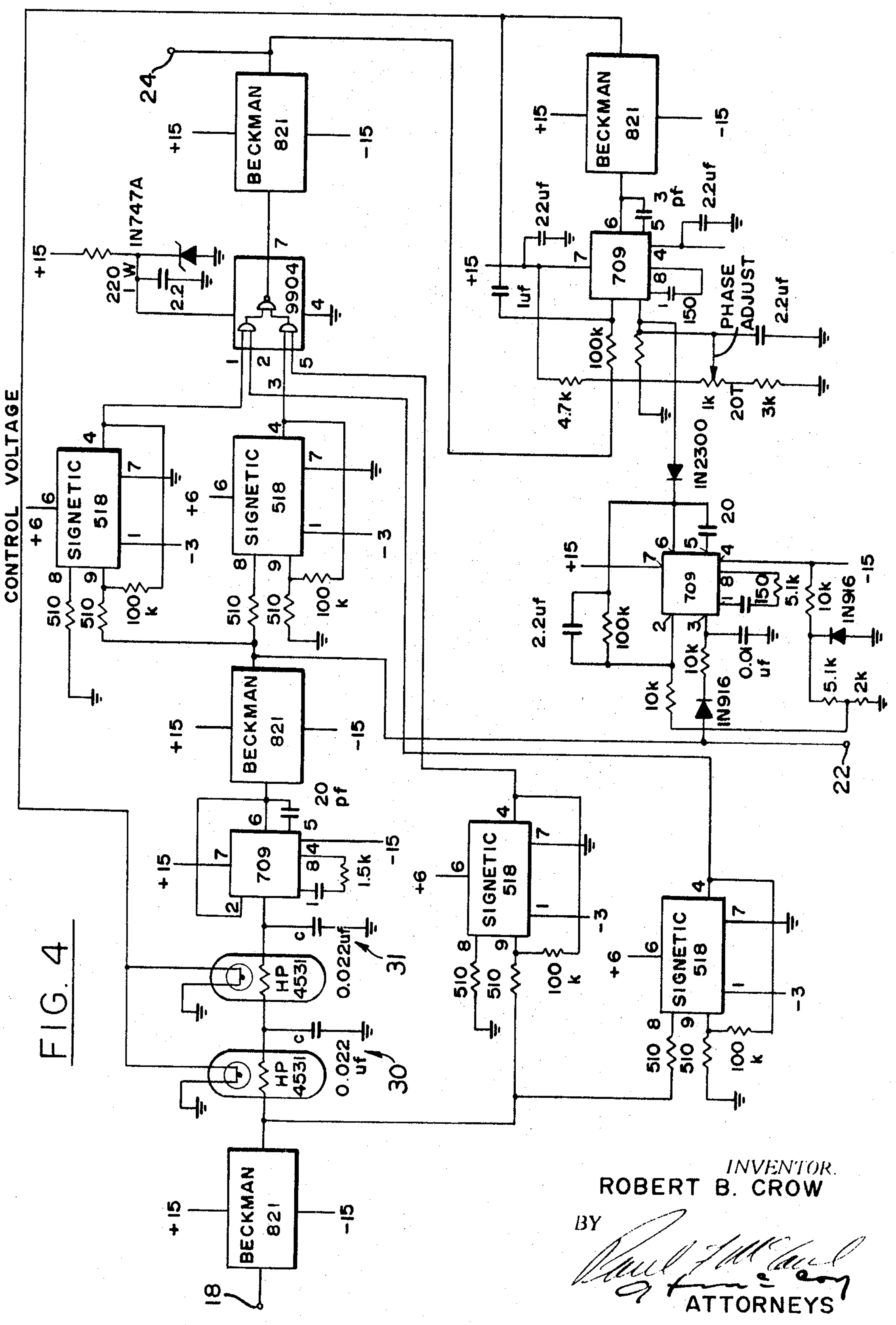
FIG. 4 is a combination block and schematic diagram of an embodiment of the present invention which was actually reduced to practice.

In one embodiment which was actually reduced to practice, various commercially available units were interconnected as shown in FIG. 4. The buffer amplifiers comprised amplifiers type 821 of Beckman Instruments, the operational amplifiers were type $\mu$A709 of Fairchild, the half adder was also a Fairchild unit, type 9904, while the Schmitt triggers were type 518 of Signetic. The photoresistors comprised two Hewlett-Packard photoresistors type 4531 which have resistance dynamic ranges varying from 150 ohms to over 600 kilohms in response to lamp voltage changes from 10 to 2 volts. Such photoresistors, due to their wide dynamic resistance ranges, enabled the generator to operate very satisfactorily over an input signal frequency from 0.1 to 100 kHz. Once phase lock was achieved, the signal at terminal 22 was always the cosine of the input signal frequency and the signal at terminal 24 was the second harmonic of the input signal.

It should be pointed out that FIG. 4 is included to represent one specific embodiment which was reduced to practice rather than to limit the invention thereto. It is appreciated that different types of amplifiers or other units may be incorporated in the actual implementation of the teachings of the invention without departing from the true spirit thereof.

What is claimed is:

1. A wide-band sine wave quadrature and second harmonic generator comprising:
   - input means for receiving a sine wave input signal;
   - voltage-controlled phase shift means to which the received input signal is applied for shifting the phase of said input signal as a function of a control voltage applied to said phase shift means; and
   - control means coupled to said input means and to said phase shift means for applying a control voltage to said phase shift means as a function of the integration of the product of said input signal and the phase-shifted output of said phase shift means, said control means including multiplying means for multiplying said input signal by the output of said phase shift means to provide a signal at twice the frequency of the sine wave input signal when said phase shift means provide a phase shift of 90°.

2. The arrangement as recited in claim 1 wherein said input signal is a sine wave definable as $\sin(wt)$, the output of said multiplying means is a sine wave definable as $\sin(2wt)$ and the output of said phase shift means is a cosine wave definable as $\cos(wt)$, when the phase shift is 90°, where $w=2\pi f$ and $f$ is in the range of 0.1 to 100 kHz.

3. The arrangement as recited in claim 1 wherein said voltage-controlled phase shift means includes resistive-capacitive means and means for varying the resistance of said resistive-capacitive means as a function of the amplitude of said control voltage, said multiplying means providing a square wave at twice the frequency of the input signal which contains a DC component when the phase shift is other than 90°, and said control means including an integrator responsive to said DC component for providing said control voltage to vary the resistance of said resistive-capacitive means to eliminate said DC component by adjusting the phase shift to be 90°.

4. The arrangement as recited in claim 1 wherein said voltage-controlled phase shift means includes capacitive means and photoresistive means for controlling the phase shift as a function of the control voltage applied to said photoresistive means.

5. The arrangement as recited in claim 1 wherein said control means provides a square wave at twice the frequency of the input signal which contains a DC component when the phase shift is other than 90°, said control means including an integrator responsive to the output of said multiplying means for providing said control signal to adjust the phase shift to equal 90° and thereby eliminate the DC component in the output of said multiplying means.

6. The arrangement as recited in claim 5 wherein said voltage-controlled phase shift means includes resistive-capacitive means and means for varying the resistance of said resistive-capacitive means as a function of the amplitude of said control voltage.

7. A frequency doubler and sine wave quadrature generator comprising:
   - an input terminal for receiving a sine wave input signal;
   - phase shift means coupled to said input terminal for phase shifting the input signal;
   - a multiplier coupled to said input terminal and to said phase shift means for multiplying the input signal by the phase-shifted signal to provide a square wave output at twice the input signal frequency, when the phase shift is 90°, said square wave output including a DC component when the phase shift is other than 90°; and
   - an integrator responsive to the multiplier's output for providing a control voltage to said phase shift means as a function of the DC component in the square wave output to control the phase shift means to provide a phase shift of 90° and thereby minimize the DC component in the multiplier's output.

8. The arrangement as recited in claim 7 wherein said voltage-controlled phase shift means includes resistive-capacitive means and means for varying the resistance of said resistive-capacitive means as a function of the amplitude of said control voltage.

9. The arrangement as recited in claim 7 wherein said voltage-controlled phase shift means includes capacitive means and photoresistive means for controlling the phase shift as a function of the control voltage applied to said photoresistive means.

* * * * *